United States Patent
Wallace

(10) Patent No.: US 12,299,952 B1
(45) Date of Patent: May 13, 2025

(54) SYSTEM AND METHOD FOR CLUTTER SUPPRESSION

(71) Applicant: BAE SYSTEMS INFORMATION AND ELECTRONIC SYSTEMS INTEGRATION INC., Nashua, NH (US)

(72) Inventor: Jeffrey A. Wallace, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 374 days.

(21) Appl. No.: 17/851,547

(22) Filed: Jun. 28, 2022

(51) Int. Cl.
| | |
|---|---|
| G06V 10/62 | (2022.01) |
| G06T 1/20 | (2006.01) |
| G06V 10/30 | (2022.01) |
| G06V 10/72 | (2022.01) |
| G06V 10/75 | (2022.01) |
| G06V 20/40 | (2022.01) |

(52) U.S. Cl.
CPC ............... G06V 10/62 (2022.01); G06T 1/20 (2013.01); G06V 10/30 (2022.01); G06V 10/72 (2022.01); G06V 10/75 (2022.01); G06V 20/49 (2022.01)

(58) Field of Classification Search
CPC ........ G06V 10/62; G06V 10/30; G06V 10/72; G06V 10/75; G06V 20/49; G06T 1/20
See application file for complete search history.

(56) References Cited

U.S. PATENT DOCUMENTS

| | | | |
|---|---|---|---|
| 7,505,608 B2 | 3/2009 | Portigal et al. | |
| 8,611,600 B2 | 12/2013 | Newman et al. | |
| 8,692,889 B2 | 4/2014 | Rakes | |
| 10,453,187 B2 | 10/2019 | Peterson et al. | |
| 11,244,184 B2 | 2/2022 | Chioniere | |
| 11,797,022 B1 * | 10/2023 | Ballantyne | G06T 7/13 |
| 2011/0279682 A1 | 11/2011 | Li et al. | |
| 2021/0034901 A1 * | 2/2021 | Chen | G06T 7/90 |

FOREIGN PATENT DOCUMENTS

| | | |
|---|---|---|
| EP | 0762138 | 12/2001 |
| EP | 3503027 | 6/2019 |
| EP | 3432257 | 5/2021 |
| WO | 2009045578 | 4/2009 |
| WO | 2017052422 | 3/2017 |

* cited by examiner

*Primary Examiner* — Amandeep Saini
*Assistant Examiner* — Andrew S Budisalich
(74) *Attorney, Agent, or Firm* — Sand, Sebolt & Wernow LPA

(57) ABSTRACT

The system and method described herein utilizes spectral data, spatial data, and temporal data, simultaneously, to provide an improved clutter suppression technique to provide an improved output for feeding into an object detection protocol. This clutter suppression technique that uses spectral data, spatial data, and temporal data, simultaneously, results in improved processing capabilities by reducing the amount of processing power needed to obtain the resultant output. The present disclosure utilizes particular protocols and processes to effectuate the usage and processing of spectral data, spatial data, and temporal data, simultaneously.

13 Claims, 4 Drawing Sheets

SYSTEM AND METHOD FOR CLUTTER SUPPRESSION

TECHNICAL FIELD

The present disclosure relates to a system and method for object detection. More particularly, the present disclosure relates an improved clutter suppression technique to more efficiently detect an object.

BACKGROUND

In the current state of the art, there are two broad philosophies for detecting objects utilizing infrared (IR) imagery by way of a clutter suppression technique having a resultant output that is provided to a discriminatory object detection protocol.

The first broad philosophy for a clutter suppression technique utilizes the concept of understanding the scene information in two or more images and determining/looking for changes in the scene information between those two or more images to decipher a candidate object. The second broad philosophy for another clutter suppression technique is to quantify a specific item to be detected and look for said item in the IR imagery.

Some prior systems use standard anomaly detection methods and processes in their clutter suppression technique. Some of these exemplary methods and processes use spatial data alone, spectral data alone, or temporal data alone, or combinations of two, but not all three together, in their clutter suppression technique.

SUMMARY

It has been determined that it is advantageous to utilize spectral data, spatial data, and temporal data, simultaneously, to provide a clutter suppression technique that will result in an output that is to be provided to an object detection protocol. The clutter suppression technique of the present disclosure uses spectral data, spatial data, and temporal data, simultaneously, and results in improved processing capabilities by reducing the amount of processing power needed to obtain the resultant output. The present disclosure utilizes particular protocols and processes to effectuate the usage and processing of spectral data, spatial data, and temporal data, simultaneously.

According to one aspect, an exemplary embodiment of the present disclosure may provide a method for clutter suppression in an object detection technique, the method comprising: estimating a first scene in a first image using spectral data and temporal data obtained from an optical sensor on a moving platform; estimating a second scene in a second image using spectral data and temporal data from the optical sensor on the moving platform; detecting the presence of a candidate object based on simultaneous analysis of spatial data between the first image and the second image, spectral data, and temporal data; and producing a clutter suppressed image. This exemplary embodiment or another exemplary embodiment may further provide performing a statistical analysis to determine whether a new observation in the second image is related to an observation from the first image. This exemplary embodiment or another exemplary embodiment may further provide registering, at a first pixel on a focal plane array, an observation in the first image; registering, at a second pixel on the focal plane array, the new observation in the second image; associating the observation in the first image with the new observation in the second image if the new observation is within a spatial parameter between two or more pixels on the focal plane array; wherein if the new observation is within the spatial parameter then the new observation is not the candidate object, and if the new observation is not within the spatial parameter then classifying the new observation as the candidate object. This exemplary embodiment or another exemplary embodiment may further provide determining whether the new observation can be spatially associated with a distribution of previously obtained scene information from estimating the first scene at a pixel associated with the first image and within a parameter of the pixel in the second image; and determining that there is a match between the pixel and a second pixel within the parameter, then indicating that there is not detection of the candidate object. This exemplary embodiment or another exemplary embodiment may further provide determining a spatial parameter associated with at least one pixel between the first image and the second image. This exemplary embodiment or another exemplary embodiment may further provide selecting a radius of how far away from the at least one pixel in the first image to be evaluated. This exemplary embodiment or another exemplary embodiment may further provide selecting the radius in response to a determination of a velocity or speed at which the platform is moving. This exemplary embodiment or another exemplary embodiment may further provide determining whether a second pixel within the radius of the at least one pixel contains the presence of the new observation in the second image; and wherein if the second pixel contains the presence of the new observation in the second image, then concluding that the new observation is not the candidate object; wherein the presence of the new observation is not within the radius of the at least one pixel in the second image, then concluding that the new observation is the candidate object that needs to be interrogated further.

In another aspect, an exemplary embodiment of the present disclosure may provide a method comprising: effecting an optical sensor to be installed platform; effecting the platform to be moved; effecting a plurality of sequential images or video stream to be captured via the optical sensor on the platform while the platform is moving; and effecting a suppression of clutter in the plurality of sequential images or in frames of the video stream by simultaneously analyzing spectral data, spatial data, and temporal data obtained from the optical sensor. This exemplary embodiment or another exemplary embodiment may further provide effecting a first scene in a first image to be estimated using spectral data and temporal data obtained from an optical sensor on a moving platform; effecting a second scene in a second image to be estimated using spectral data and temporal data from the optical sensor on the moving platform; effecting a presence of a candidate object to be detected based on simultaneous analysis of spatial data between the first image and the second image, spectral data, and temporal data; and effecting a clutter suppressed image to be produced. This exemplary embodiment or another exemplary embodiment may further provide effecting a statistical analysis to be performed to determine whether a new observation in the second image is related to an observation from the first image. This exemplary embodiment or another exemplary embodiment may further provide effecting registration, at a first pixel on a focal plane array, of an observation in the first image; effecting registration, at a second pixel on the focal plane array, of the new observation in the second image; effecting the observation in the first image to be associated with the new observation in the second image if the new observation is within a spatial parameter between two or more pixels on the focal plane array; wherein if the new observation is within the spatial parameter then the new observation is not the candidate object, and if the new observation is not within the spatial parameter then classifying the new observation as the candidate object. This exemplary embodiment or another exemplary embodiment may further provide effecting a determination of whether the new observation can be spatially associated with a distribution of previously obtained scene information from estimating the first scene at a pixel associated with the first image and within a parameter of the pixel in the second image; and effecting a determination that there is a match between the pixel and a second pixel within the parameter, then indicating that there is not detection of the candidate object. This exemplary embodiment or another exemplary embodiment may further provide effecting a determination that a spatial parameter associated with at least one pixel between the first image and the second image. This exemplary embodiment or another exemplary embodiment may further provide effecting a radius to be selected for how far away from the at least one pixel in the first image to be evaluated. This exemplary embodiment or another exemplary embodiment may further provide effecting the radius to be selected in response to a determination of a velocity or speed at which the platform is moving. This exemplary embodiment or another exemplary embodiment may further provide determining whether a second pixel within the radius of the at least one pixel contains the presence of the new observation in the second image; and wherein if the second pixel contains the presence of the new observation in the second image, then concluding that the new observation is not the candidate object; wherein the presence of the new observation is not within the radius of the at least one pixel in the second image, then concluding that the new observation is the candidate object that needs to be interrogated further.

In yet another aspect, an exemplary embodiment of the present disclosure may provide at least one non-transitory computer readable storage medium on a moving platform in operative communication with a graphical processing unit (GPU) in an infrared (IR) image sensor, the storage medium having instructions stored thereon that, when executed by the GPU, perform operations to determine the presence of a candidate object needing to be further evaluated by a discriminatory object classification technique, the instructions comprising: instructions to estimate a first scene in a first image using spectral data and temporal data obtained from the IR sensor on the moving platform; instructions to estimate a second scene in a second image using spectral data and temporal data from the IR sensor on the moving platform; instructions to detect the presence of the candidate object based on simultaneously analysis of spatial data between the first image and the second image, spectral data, and temporal data; and instructions to produce a clutter suppressed image having an indicator of the candidate object needed for further object classification. This exemplary embodiment or another exemplary embodiment may further provide instructions to register, at a first pixel on a focal plane array, an observation in the first image; instructions to register, at a second pixel on the focal plane array, a new observation in the second image; instructions to associate the observation in the first image with the new observation in the second image if the new observation is within a spatial parameter between two or more pixels on the focal plane array; and instructions to determine that if the new observation is within the spatial parameter then the new observation is not the candidate object, and if the new observation is not within the spatial parameter then classify the new observation as the candidate object needed for further object classification.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
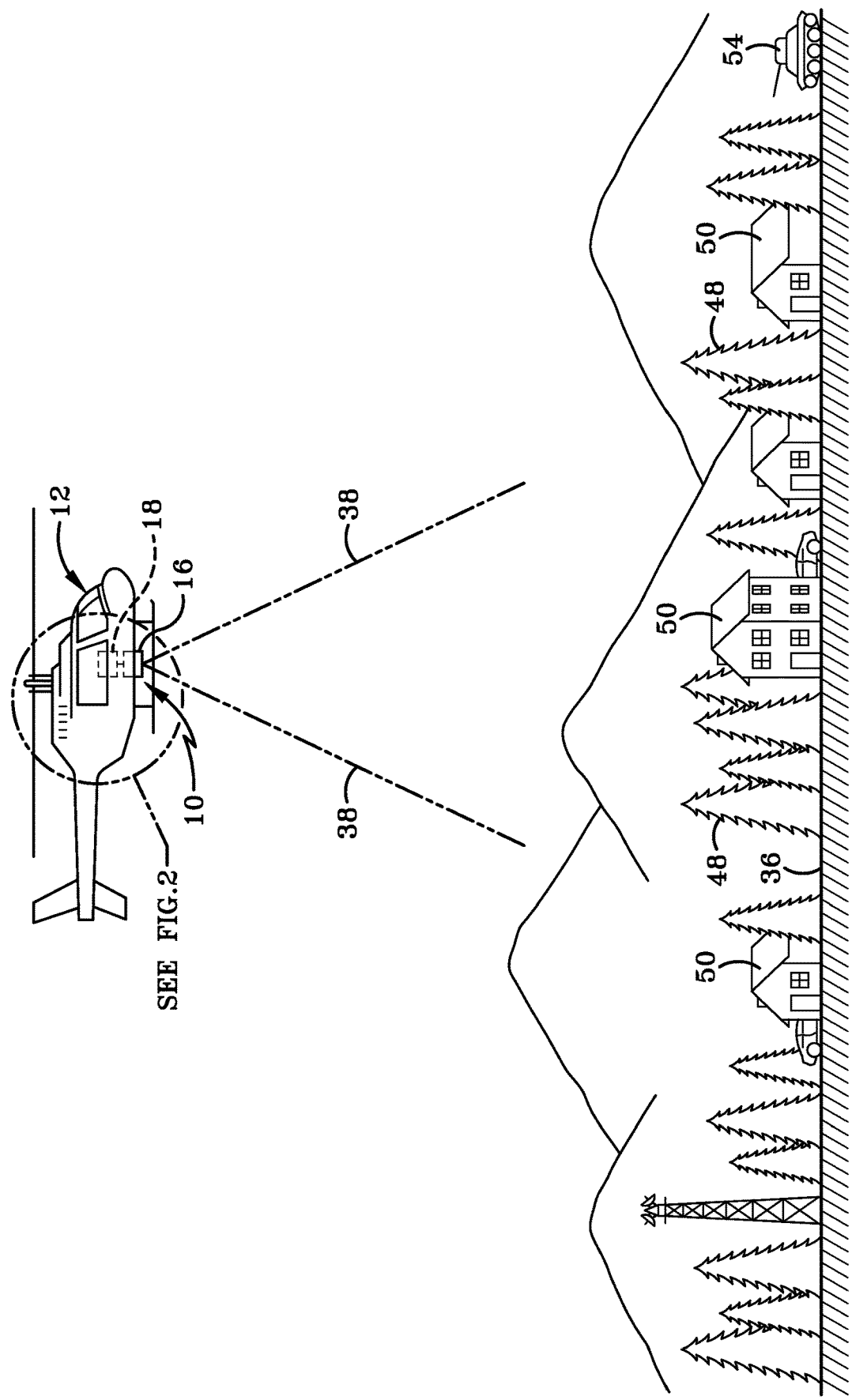
FIG. 1 is a diagrammatic view of a platform carrying an exemplary object detection system that implements a clutter suppression technique of the present disclosure while traveling over an environment in which a field of view from at least one sensor is directed towards a geographic landscape.

The present disclosure relates to addressing and solving a problem that is needed for improved clutter suppression techniques and a resultant output that is used for detecting threats or other objects, such as surface to air missiles, or other types of interesting targets in an infrared image stream. Exemplary moving platforms include airborne vehicles, sea-based vehicles, moving land vehicles, or space vehicles, regardless of whether these platforms are manned or unmanned. Alternatively, the system of the present disclosure may be mounted on a static, non-moving structure.

The system of the present disclosure utilizes frames in a video sequence or streams of sequential images, such as infrared (IR) imagery, which may be of a single band or multiple bands (i.e. multichannel—different parts of the infrared spectrum) that are captured together. The system of the present disclosure utilizes these IR images or image frames to detect, look for, or otherwise identify changes in the scene information of the image or images. Stated otherwise, the system of the present disclosure is not necessarily and explicitly trying to detect specific phenomenology of a specific threat or object, but rather the system of the present disclosure quantifies the scene information to find regions in that imagery that are behaving differently between two or more sequential images, which are different in time, to obtain a better understanding of the scene. The system of the present disclosure utilizes an analysis of the differences between two images to decipher a candidate object for detection and further analysis in a downstream and more precise, highly discriminatory, object detection and identification technique.

In one example, there is a clutter suppression technique that is a preprocessing component or earlier step of a threat warning or object detection process. This example determines candidate detections in the IR imagery that would then be fed to another algorithm or logic for more specialized processing to determine whether the candidate object is something of interest. Typically, if the threat warning system affirmatively determines that the candidate object is a threat or other object of interest, a signal may be generated and sent to a countermeasure system located on the platform or evasive maneuvers can be initiated. Given that the method of the present disclosure is the first or earlier portion of a threat warning system, it may also be referred to as a clutter suppression method or a clutter suppression technique, or a clutter suppression algorithm. Essentially, the clutter suppression technique of the present disclosure is attempting to evaluate the structured infrared imagery entering into the system at a fairly high rate. At this initial phase, there is typically not the processing power to perform the highly discriminatory processing on every pixel, and thus the clutter suppression technique of the present disclosure cuts down those incoming pixels to just those that are of interest or potentially of interest. Thus, the clutter suppression technique of the present disclosure determines or finds the small number of pixels for which it would be advantageous to do more processing on through a more highly discriminatory object detection technique.

The clutter suppression technique according to one aspect of the present disclosure uses spectral data, temporal data, and spatial data simultaneously. This manner of processing was generally not performed by previous clutter suppression techniques in estimating the variances in the scene between different or sequential images. Stated otherwise, the clutter suppression technique of the present disclosure uses spectral, spatial, and temporal information simultaneously to obtain a scene estimation that results in fewer false positives. Having fewer false positives is beneficial inasmuch as it allows the system to reduce the amount of processing needed based on the improved suppressed clutter. By utilizing the spectral information, spatial information, and temporal information, all simultaneously, the clutter suppression technique is able to increase the processing efficiency over that which was previously achieved with previous techniques that may have used two pieces of information and generally not at the same time. As such, the improved processing technique frees up additional power or processing capabilities to be consumed elsewhere on the platform or for other processing to be performed.

As used here, spectral data or information refers to the multiple different wavelengths captured by at least one image sensor. Spatial data or information refers to information inherent in the structure of the image including pixels values and whether adjacent or pixels near each other have or captured similar spectral information (i.e., local spectral information) of the scene as nearby or adjacent pixels, which are captured by the at least one image sensor. Temporal data refers to the capture of a video sequence or successive images over time that includes both the spectral and spatial data obtained from the at least one image sensor.

FIG. 1 diagrammatically depicts an object or threat detection system in accordance with certain aspects of the present disclosure and is shown generally at 10. The threat detection system 10 is operably engaged with a platform 12 and includes at least one image sensor 16, at least one processor 18, spectral data logic 20, spatial data logic 22, temporal data logic 24, and registration logic 26.

In accordance with one aspect of the present disclosure, the platform 12 may be any moveable platform configured to be elevated relative to a geographic landscape 36. Some exemplary moveable platforms 12 include, but are not limited to, unmanned aerial vehicles (UAVs), manned aerial vehicles, projectiles, guided projectiles, or any other suitable moveable platforms.

When the platform 12 is embodied as a moveable aerial vehicle, the platform 12 may include a front end or a nose opposite a rear end or tail. Portions of the detection system 10 may be mounted to the body, the fuselage, or internal thereto between the nose and tail of the platform 12. While FIG. 1 depicts that some portions of the threat detection system 10 are mounted or carried by the platform 12 adjacent a lower side of the platform 12, it is to be understood that the positioning of some components may be varied and the figure is not intended to be limiting with respect to the location of where the components of the system 10 are provided. For example, and not meant as a limitation, the at least one sensor 16 is mounted on the platform 12. Furthermore, some aspects of the at least one sensor 16 may be conformal to the outer surface of the platform 12 while other aspects of the at least one sensor 16 may extend outwardly from the outer surface of the platform 12 and other aspects of the at least one sensor 16 may be internal to the platform 12.

The at least one sensor 16 may be an optical sensor mounted on the lower side of the platform 12. The at least one sensor 16 is configured to observe scenes remote from the platform 12, such as, for example, a geographic landscape 36 within its field of view (FOV) 38. Inasmuch as the at least one sensor 16 has a FOV 38, and in one example, the at least one sensor 16 is an image sensor or imager. Further, when the at least one sensor 16 is embodied as an imager, the imager may be any imager capable of imaging terrain, such as, for example, a visible light imager, a near-infrared imager, a mid-infrared imager, a far-infrared imager, or any other suitable imager. In one example, the imager has a frame rate of at least 100 frames per second. In another example, the imager has a frame rate of at least 500 frames per second. In yet another example, the imager has a frame rate between approximately 500 frames per second and approximately 1,000 frames per second. Although certain frame rates of the imager have been described, it is to be understood that the imager may have any suitable frame rate. The imager, or the at least one sensor 16, may be an active sensor or a passive sensor. However, certain aspects of the present disclosure are operative with the at least one sensor 16 being a passive sensor 16. An active sensor 16 would refer to the fact that the at least one sensor 16 or the imager receives data observed through its FOV 38 in response to powered signals transmitted from the platform, such as radar or LIDAR. A passive sensor 16 or imager would refer to the fact that the at least one sensor 16 or the imager receives data observed through its FOV 38 of the scene that is being observed, but does not actively transmit signals to obtain a received signal.

Furthermore, when the at least one sensor 16 is embodied as a passive imager, the imager will have some components that are common to image sensors such as lens, domes, focal plane arrays, and may additionally include processors such as a Graphical Processing Unit (GPU) and associated processing hardware. Towards that end, a reader of the present disclosure will understand that the at least one sensor 16 may include standard imaging components adapted to sense, capture, and detect imagery within its FOV 38. The imagery may be in a spectrum that is not viewable to the human eye, such as, for example, near-infrared imagery, mid-infrared imagery, and far-infrared imagery. However, one particular embodiment of the present disclosure utilizes IR imagery.

While the FOV 38 in FIG. 1 is directed vertically downward towards the geographic landscape 36, it is further possible for a system in accordance with the present disclosure to have a sensor 16 that projects its FOV 38 outwardly and forwardly from the nose of the platform 12 or outwardly and rearward from the tail of the platform 12, or in any other suitable direction. However, as will be described in greater detail below, certain implementations and embodiments of the present disclosure are purposely aimed downward so as to capture a scene image from the geographic landscape 36 to be used to provide navigation and/or position and/or location and/or geolocation information to the platform 12.

Generally, the sensor 16 has an input and an output. An input to the sensor 16 may be considered the scene image observed by the FOV 38 that is processed through the imagery or sensing components within the sensor 16. An output of the sensor may be an image captured by the sensor 16 that is output to another hardware component or processing component.

With continued reference to FIG. 1, and having thus described the general structure of system 10, reference is now made to features of the geographic landscape 36. For example, and not meant as a limitation, the geographic landscape 36 may include natural features 48, such as trees, vegetation, or mountains, or manmade features 50, such as buildings, roads, or bridges, etc., which are viewable from the platform 12 through the FOV 38 of the sensor 16. Also within the FOV 38 is a candidate object 54, which may be a threat or another object of interest.

The system 10 uses the sensor 16 to capture a scene image of a scene remotely from the platform 12. The at least one processor 18 generates a signal in response to the sensor 16 capturing the scene image. Metadata may be provided for each captured scene image. For example, and not meant as a limitation, the metadata may include a frame number of the scene image within a flight data set, a latitude position of the platform 12 in radians, a longitude position of the platform 12 in radians, an altitude position of the platform 12 in meters, a velocity of the platform 12 in meters per second, and a rotation of the platform 12 in degrees. Metadata associated with the at least one sensor 16 may also be provided, such, as, for example, mounting information related to the at least one sensor 16. Although examples of metadata have been provided, it is to be understood that the metadata may include any suitable data and/or information.

Additionally, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Figure 2:
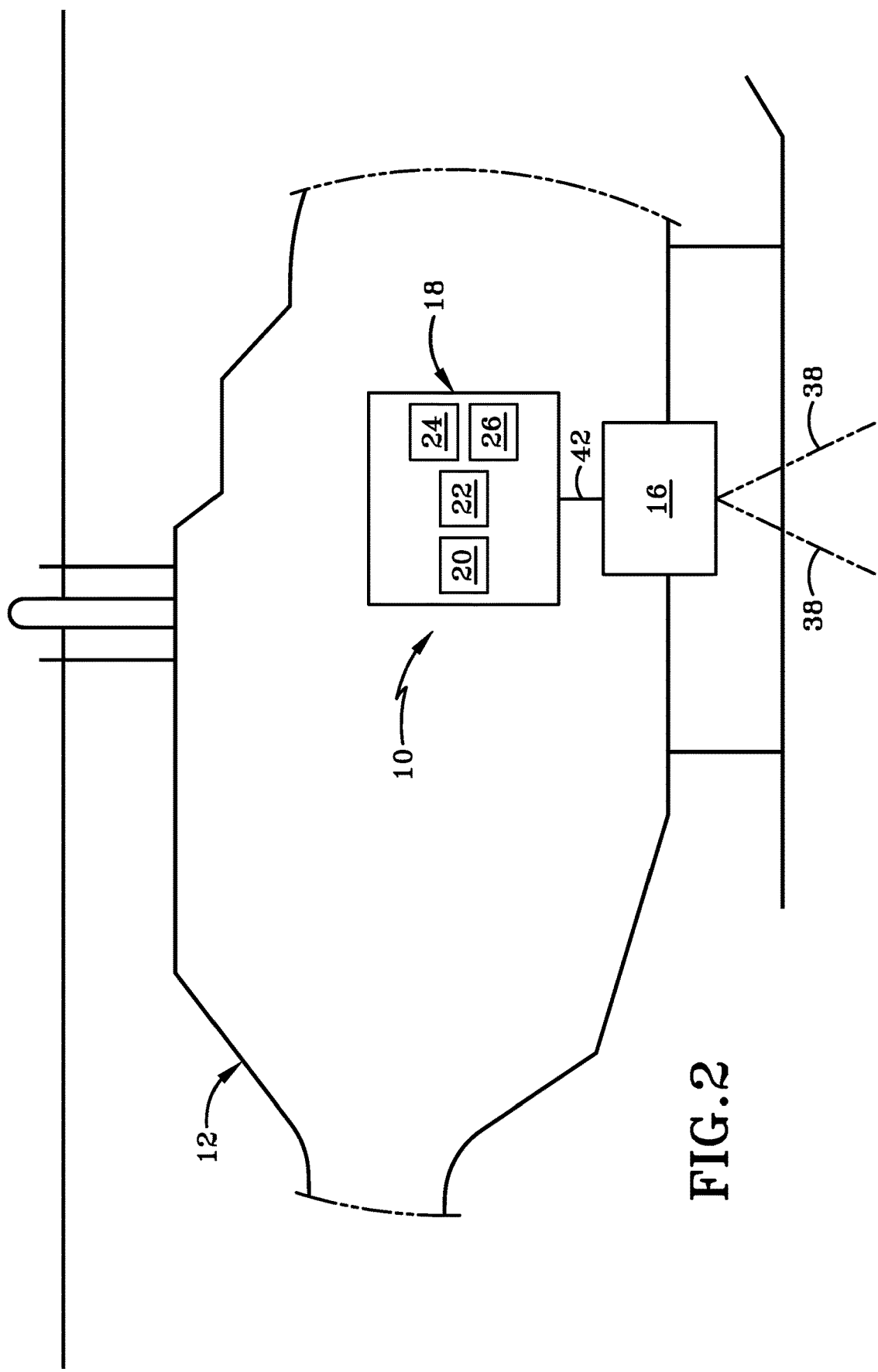
FIG. 2 is an enlarged schematic view of a portion of the platform carrying the object detection system as highlighted by the dashed circle labeled "SEE FIG. 2" from FIG. 1

FIG. 2 depicts the at least one processor 18 is in operative communication with the at least one sensor 16. More particularly, the at least one processor 18 is electrically connected with the output of the sensor 16. In one example, the at least one processor 18 is integrally formed within sensor 16. In another example, the processor 18 is directly wired the output of the sensor 16. However, it is equally possible for the at least one processor 18 to be wirelessly connected to the sensor 16. Stated otherwise, a link 42 electrically connects the sensor 16 to the at least one processor 18 and may be any wireless or wired connection, integral to the sensor 16 or external to sensor 16, to effectuate the transfer of digital information or data from the sensor 16 to the at least one processor 18. The at least one processor 18 is configured to or is operative to generate a signal in response to the data received over the link 42 from the sensor 16.

In some implementations, the data that is sent over the link 42 are scene images or video streams composed of sequential frames captured by the sensor 16 that is observing the geographic landscape 36 below through its FOV 38. As will be described in greater detail below, the at least one processor 18 may include various logics, such as, for example, spectral data logic 20, spatial data logic 22, temporal data logic 24, and registration logic 26, which performs functions described in greater detail below.

Spectral data logic 20 includes instructions operable with at least one non-transitory computer readable storage medium having instructions encoded thereon that, when executed by the at least one processor 18, implements operations to obtain a single band or multiple bands (i.e. multichannel-different parts of the infrared spectrum) of image data that are captured together in an image or in a frame of a video stream from the sensor 16.

Spatial data logic 22 includes instructions operable at least one non-transitory computer readable storage medium having instructions encoded thereon that, when executed by the at least one processor 18, implements operations to determine the spatial locality or spatial position of a candidate object 54 relative to a pixel on the focal plane array within image data from an image or from a frame of a video stream from the sensor 16.

Temporal data logic 24 includes instructions operable at least one non-transitory computer readable storage medium having instructions encoded thereon that, when executed by the at least one processor 18, implements operations to determine the time at which the image or from the frame of the video stream was obtained by the sensor 16.

The registration logic 26 includes instructions operable at least one non-transitory computer readable storage medium having instructions encoded thereon that, when executed by the at least one processor 18, implements operations to register the scene image captured by the sensor 16 with a reference image to provide a registration solution.

In accordance with one aspect of the present disclosure, the processor 18 may be the GPU that is performing the processing functionality to detect the candidate object based on the clutter suppression technique described herein, which may be a portion of an anomaly detection method or process. The GPU may be located on the platform or it may be located at a remote location separated from the platform, wherein when the GPU is at a remote location wireless signal transmission logic would be present on the platform to send the signal data to a receiver that feeds the signal data to the GPU for processing.

Sensor 16 may be one of many sensors on platform 12, such as a plurality of IR sensors or IR imager, each including at least one focal plane array (FPA). Each FPA comprises a plurality of pixels. The IR sensors are able to detect spectral wavelengths. In this present disclosure, the IR sensors are capable of detecting multiple wavelengths in the visible and/or nonvisible spectrum of light.

The data or information from pixels that form one image have a spatial orientation relative to other pixels. Adjacent pixels in an image typically have shared or common information to an adjacent pixel in the overall image. The use of spatial data as referred to herein, refers to spatial data in the image. Thus, the present disclosure uses information in an image near a particular pixel to generate a detection of a candidate object at that particular pixel.

The system of the present disclosure utilizes spatial data, spectral data, and temporal data simultaneously to conduct its clutter suppression analysis because the system utilizes a sequence of images. Thus, the last value of a pixel assists in understanding the scene that the system should expect or predict to see in the next time or sequential image at that pixel or an adjacent pixel. Likewise, the spectral information (especially when there are multiple different wavelengths) imaging the same pixel is utilized to understand the scene that the system should expect or predict to see in the next time or sequential image at that pixel or an adjacent pixel. The spectral information has a value for each pixel at each wavelength. The scene or estimation of scene information has a ratio between those pixel bands, and if that ratio changes between sequential pictures, then there is a spectral difference in that pixel that may be meaningful towards the candidate object detection.

For tracking the temporal data, or time, typically the IR sensor will timestamp the images or there may be another processor that receives the imagery and timestamps the same. In accordance with the present disclosure, it would be typical or common for the IR sensor to perform the timestamp function. The system also includes at least one non-transitory computer readable storage medium to host a set of instructions that when executed by the processor 18, such as the GPU, execute instructions that accomplish the methods and processes disclosed herein. In one particular embodiment, one exemplary processor 18 that would be readily available for use would be a combination CPU/GPU processor. For the applications detailed herein, it would be preferable for the GPU/CPU processor to be located on the moving platform, however that need not be the case and the processor 18 may be physically located elsewhere.

After the clutter suppression technique has been performed in the CPU/GPU processor 18, the output is another image, which may be referred to as a clutter suppressed image, that is largely blank or black with one, a couple, a few or more bright spots that may be considered points of interest or candidate objects. The clutter suppressed image is generated based on a thresholding protocol or technique in which a value for a pixel is determined relative to the distribution of its scene or estimation of scene information. The distance between these values is applied to a threshold parameter. Objects that are sufficiently far way or outside the threshold are determined to be the candidate objects for further evaluation. The threshold value is application-specific that may be set by a program developer, or it may be an adaptive threshold using adaptive techniques or adaptive filtering techniques that varies the threshold level based on application-specific needs or protocols. For example, if there was an area that was producing a lot or many false detections, then the program developer or an adaptive filtering technique may choose to raise the threshold to filter out or remove some of the instances of the false detection rates. A typical threshold is a number of standard deviations away from the mean of a distribution. The value of the threshold is typically a function of how many false detections the system can handle for processing. Then, the outputted clutter suppressed image may be fed to the downstream techniques of the threat warning system for higher discriminatory processing to determine whether the candidate object is a threat or object of interest.

Having thus described the components of the system that implement the clutter suppression techniques, protocols, process, or methods detailed herein, reference is now made to its operation and the mathematical operations that accomplish said operation of the system.

The clutter suppression technique utilizes functions and equations that are executed by processor 18 based on instructions stored in at least one non-transitory computer readable storage medium as discussed herein. The purposeful selection and configuration of the clutter suppression technique executed by processor 18 utilizing these functions and equations arranged in the manner detailed herein enables the clutter suppression technique to use the spectral information associated with spectral data logic 20, spatial information associated with spatial data logic 22, and temporal information associated with temporal data logic 24 at the same time, or simultaneously.

Figure 3:
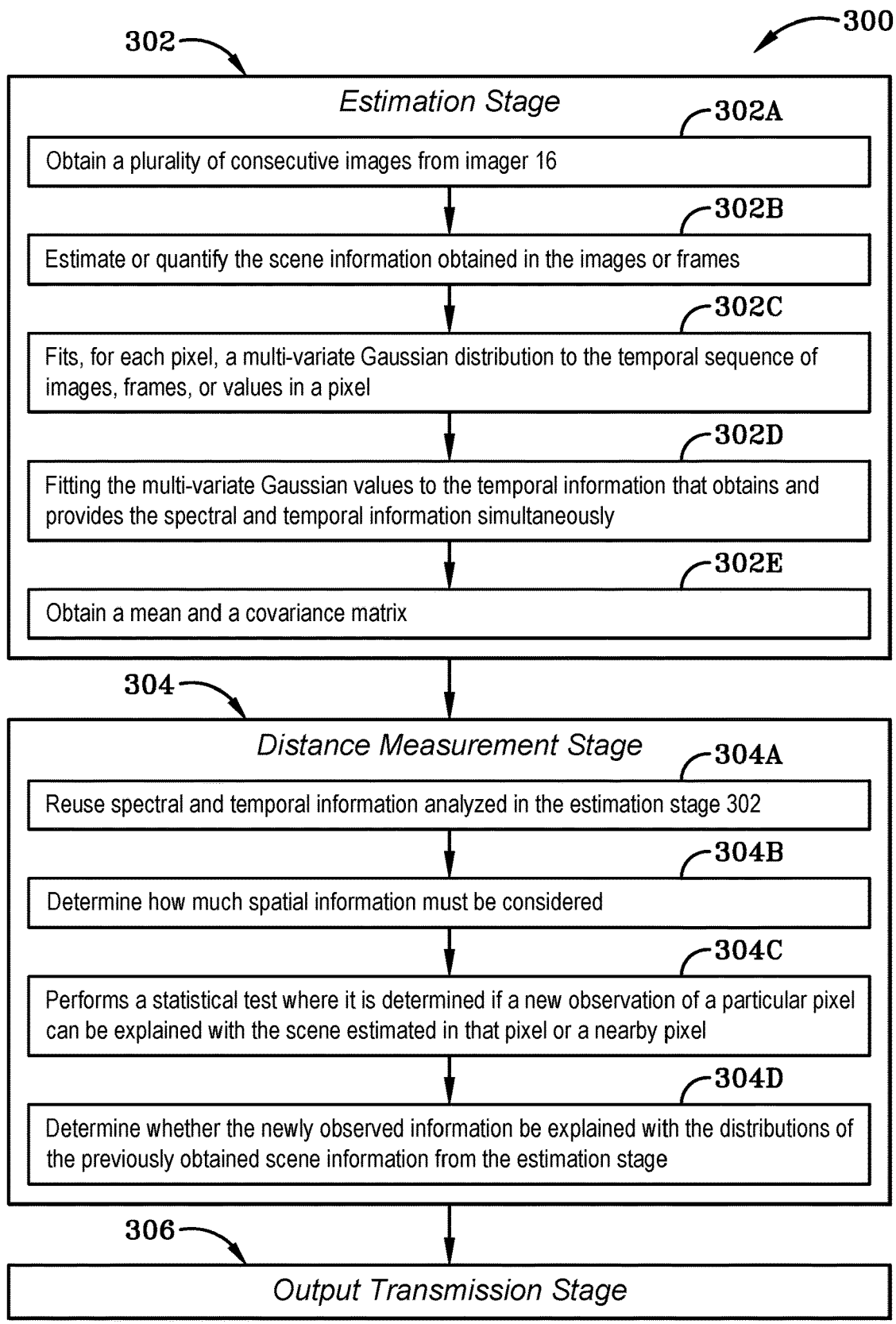
FIG. 3 is a flow chart depicting an exemplary method according to various exemplary aspects of the clutter suppression technique of the present disclosure.

With respect to the mathematical operations and the process employed by the clutter suppression technique of the present disclosure in response to execution by processor 18, there are several stages thereof. As depicted in FIG. 3, a method 300 includes is an estimation stage, which is shown generally at 302, and a distance measurement stage, which is shown generally at 304, following the estimation stage 302. After the estimation stage 302 and the distance measurement stage 304, there is an output transmission stage 306. The output transmission may be accomplished by wired or wireless data transmission logic.

In the estimation stage 302, the technique of the present disclosure takes some number of consecutive images from imager 16, which is shown generally at 302A; for example, two or more consecutive images or frames. The estimation stage 302 then utilizes the consecutive images and estimates or attempts to estimate or quantify the scene or estimation of scene information obtained in the images or frames, which is shown generally at 302B. For example, the estimation stage 302 estimates a first scene in a first image using spectral data and temporal data obtained from the optical sensor 16 on the moving platform 12 and estimates a second scene in a second image using spectral data and temporal data from the optical sensor 16 on the moving platform 12. Step 302 estimates the distribution of energy in the scene. That energy differs spectrally (i.e., multiple wavelengths) and spatially (i.e., a difference in one part of the scene from another). The estimate is built over time (i.e., temporally) by capturing successive frames to build the estimate. The estimate includes a mean (i.e., an estimate of the energy at any spatial location and wavelength) and variance (i.e., an estimate of how much the energy varies due to noise, etc. at any location and wavelength).

The estimation stage 302 fits, for each pixel (i.e., multiple spatial points in the scene of the image), a multi-variate Gaussian distribution to the temporal sequence of images, frames, or values in a pixel, which is shown generally at 302C. This is performed for every pixel in an image or frame. This multi-variate Gaussian distribution represent an estimation or is an estimation of how much energy is present in each wavelength, and this estimation also includes variance (i.e., the amount of noise present) in the scene. The spectral information is applicable to the multi-variate Gaussian distribution because each pixel has multiple values such as one per channel or one per wavelength. These values are typically between zero and a number N, wherein N equals the maximum dynamic range of the sensor. The values represent a number of counts that represent a number of photons that was received by the imager at a particular wavelength. An exemplary explanation for performing the fitting of multi-variate Gaussian distribution to the temporal sequence of images, frames, or values in a pixel is detailed in Equations 1-7, detailed below.

The estimation stage 302 additionally includes fitting the multi-variate Gaussian distribution values to the temporal information that obtains and provides the spectral and temporal information simultaneously, which is shown generally at 302D. The multi-variate distribution results in a mean and a covariance matrix, which is shown generally at 302E that represent the spectral and temporal information. The mean is the temporal average of the pixel in each band. The covariance matrix quantifies the amount of variance that particular pixel is seeing or observing in each band and between each band. For example, the covariance will determine how much a first band is varying and how much a second band is varying and how much another band is varying, and how these bands are varying relative to each other. After the estimation stage 302 has been completed, then the distance measurement stage 304 is implemented.

In the distance measurement stage 304 of this clutter suppression technique of method 300, the spectral information associated with spectral data logic 20, spatial information associated with spatial data logic 22, and temporal information associated with temporal data logic 24 are used simultaneously. A particular example in which the spectral information associated with spectral data logic 20, spatial information associated with spatial data logic 22, and temporal information associated with temporal data logic 24 are used simultaneously is detailed in Equations 1-7, detailed below. As shown in Equations 1-7, the mean and covariance matrix images (i.e., spectral data and temporal data at each pixel or spatial point) are used in a statistical test over a small spatial area (i.e., this is the simultaneity, wherein the present disclosure uses multiple mean/covariance matrices over a spatial area) in the distance measurement stage 304.

The spatial information associated with spatial data logic 22 is implicit or inherent in the structure of the image, or more particularly, in the pixels of each image or frame. Namely, the clutter suppression technique picks or an operator designing the clutter suppression technique picks how much spatial information must be considered by the clutter suppression technique, which is shown generally at 304B. For example, one way of picking, choosing, or determining the spatial information can be a parameter, such as a radius of how far away from a certain pixel in an image or frame the technique must evaluate. Stated otherwise, the spatial information will determine how many pixels near a pixel of interest that is performing the detection should be considered. Typically, the chosen spatial parameter, for example the radius from a given pixel, is a function of the speed at which the platform 12 is moving. For example, if a platform is not moving, then there would be no need to use any spatial or significant spatial information. However, when the platform 12 is moving, then the pixel of interest in a first image or frame may be looking at a different part of the ground in a subsequent image or frame. However, nearby pixels to that specific pixel would likely be observing or detecting the previous portion of the ground that the given pixel observed in the previous image or frame because physically the platform is moving the IR sensor above the ground.

For example, a spatial parameter may be chosen by selecting a radius of one pixel, three pixels, or ten pixels away from the original given pixel to determine whether the object appears in one of the pixels within that radius in a subsequent image or frame. Thus, if the pixel within the radius parameter in the subsequent image shows a similar feature from the first pixel, then the clutter suppression technique can determine that there is likely to have been no change in the scene or estimation of scene information between the first image or frame and the second image or frame for that particular pixel representing a particular object. This will result in an outputted image indicating that there is no candidate object at that particular location.

The distance measurement stage 304 performs a statistical test or analysis to determine whether a particular pixel can be explained with a new observation in an adjacent pixel in a subsequent image or frame, which is shown generally at 304C. The distance measurement stage 304 determines whether the newly observed information is explained with the distributions of the pixels within the spatial parameter, such as a radius from the pixel, of the previously obtained scene or estimation of scene information from the estimation stage, which is shown generally at 304D. The distance measurement stage 304 does this by computing the minimum distance of the new observation from the estimated distributions of the pixels within the spatial parameter of the pixel under test. Typically, the distance measurement used is the Mahalanobis Distance, but other distance measures may be used. If the distribution can explain the observation (i.e., the minimum distance is small), then the outputted image has a small value, indicating that there is likely no detection of a candidate object.

If the distributions cannot explain the difference between two subsequent images (i.e., the minimum distance is large), then the outputted image has a large value, indicating that there is likely a detection of a candidate object. The step of 304D includes registering at a first pixel on the FPA of the sensor 16, via registration logic 26, the observation of a candidate object in the first image. Then, registering, at a second pixel on the FPA of the sensor 16, the new observation in the second image. Then, associating the observation in the first image with the new observation in the second image if the new observation is within a spatial parameter between two or more pixels on the focal plane array; wherein if the new observation is within the spatial parameter then the new observation is not the candidate object, and if the new observation is not within the spatial parameter then classifying the new observation as the candidate object 54.

A candidate object is an anomaly or a region in the image under test that is statistically different from the estimated scene. Notably, One embodiment of the present disclosure is not necessarily determining a threat or non-threat. One embodiment of the present disclosure would be solely a clutter suppression (or equivalently, anomaly detection) to indicate whether a candidate object looks unique in an area. Then, another algorithm or technique has to take the clutter suppressed results from these techniques to determine what type of object it is, and if it's a threat or not, which would be part of the output transmission stage 306 detailed below.

The method then compiles an output for the distance measurement stage 304 based on the indication of the presence or absence of a candidate object. If the candidate object is determined to be present, then the output transmission stage 306 transmits the output to a subsequent downstream processing technique for more highly discriminatory processing to determine what the candidate object may be, such as for determination as to whether the candidate object 54 is a threat or non-threat. If the object 54 is determined to be a threat, then this information can be provided to additional systems on platform 12, such as countermeasure systems or other electronic warfare systems, or other alarm systems.

Exemplary equations, processes, and techniques, which are often implemented by a computer program product or a processor coupled therewith to utilize the spectral information, spatial information, and temporal information simultaneously during the distance measurement stage 304 to reduce clutter or noise are provided below and discussed with reference to FIG. 4. As shown in Equations 1-7, particularly Equation 3, the mean and covariance matrix images (i.e., spectral data and temporal data at each pixel or spatial point) are used in a statistical test over a small spatial area (i.e., this is the simultaneity, wherein the present disclosure uses multiple mean/covariance matrices over a spatial area) in the distance measurement stage 304.

The equations and processes may utilize the Constants identified in Table 1.

TABLE 1

CONSTANTS

| Variable | Size | Description |
| --- | --- | --- |
| R | Scalar | Number of rows in image |
| C | Scalar | Number of columns in image |
| N | Scalar | Number of channels in image |

The equations and processes may utilize the Parameters identified in Table 2.

TABLE 2

PARAMETERS

| Variable | Size | Description |
| --- | --- | --- |
| $\tau$ | Scalar | Temporal correlation-number of frames to use in estimate of scene or scene information |
| $\sigma$ | Scalar | Spatial correlation-size of spatial kernel to perform statistical test against |

The equations and processes may utilize the Inputs identified in Table 3.

TABLE 3

INPUTS

| Variable | Size | Description |
| --- | --- | --- |
| $X_t(i)$ | (R, C, N) | N channel input image, wherein t = time; and i = pixel index |
| $\lambda_t(i)$ | (R, C) | Distance threshold, wherein t = time; and i = pixel index |

The equations and processes may result or produce the Outputs identified in Table 4.

TABLE 4

OUTPUTS

| Variable | Size | Description |
| --- | --- | --- |
| $z_t(i)$ | (R, C) | Distance (test statistic) measurement at time t in pixel i |
| $\hat{Y}_t(i)$ | (R, C) | Clutter suppressed image at time t in pixel i |
| $\hat{\mu}_t(i)$ | (R, C, N) | Estimated temporal mean of scene or scene information at time t in pixel i, wherein the temporal mean has the spatial data, spectral data, and temporal data encoded therein to be used simultaneously because the spatial data, spectral data, and temporal data are images that have, at each pixel i, the spectral data estimated over time that is arranged in a spatial manner, which is then processed in the distance measurement stage. |
| $\hat{\Sigma}_t(i)$ | (R, C, N²) | Estimated, unnormalized, temporal covariance of scene or scene information at time t in pixel i, wherein the temporal mean has the spatial data, spectral data, and temporal data encoded therein to be used simultaneously because the spatial data, spectral data, and temporal data are images that have, at each pixel i, the spectral data estimated over time that is arranged in a spatial manner, which is then processed in the distance measurement stage. |

Figure 4:
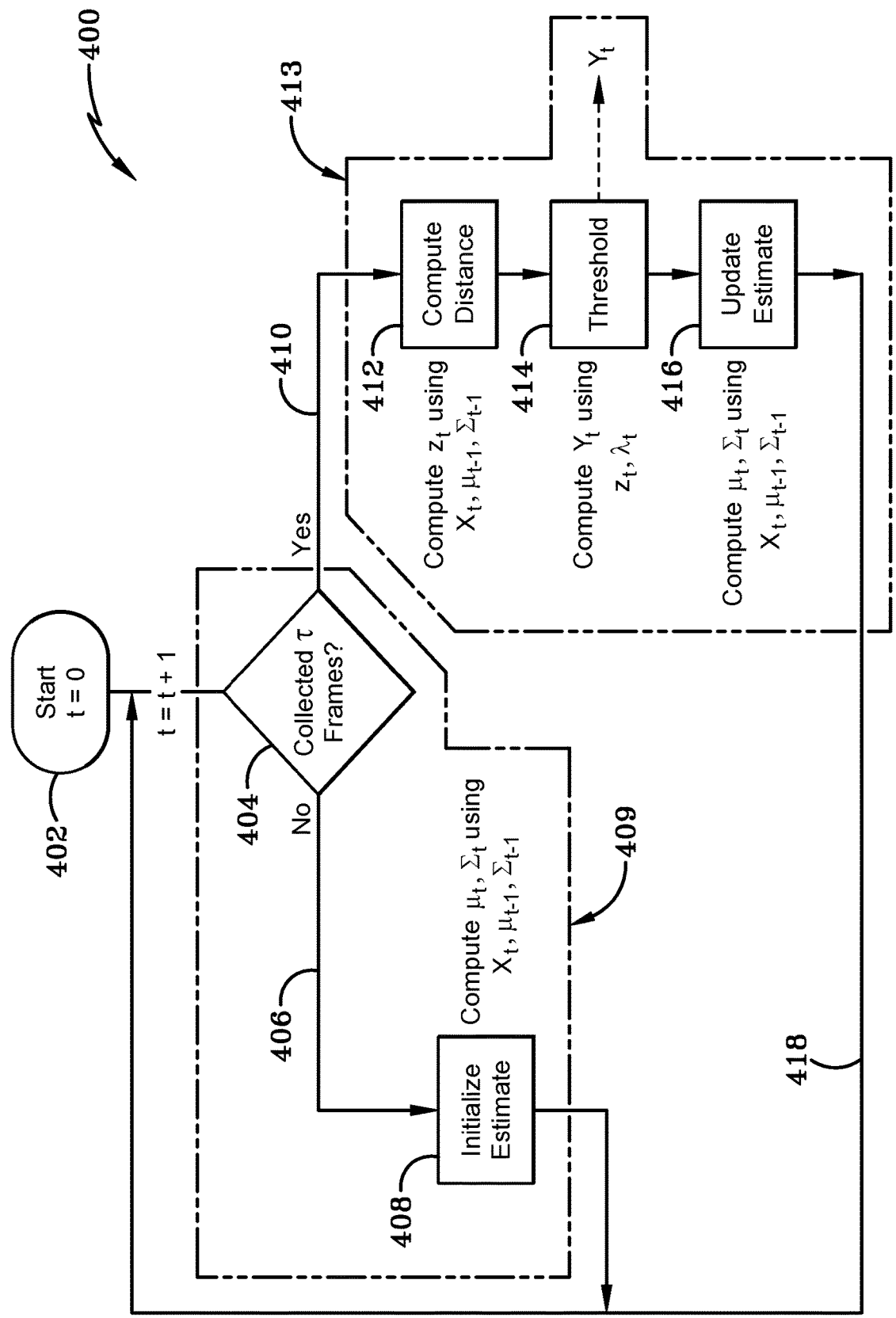
FIG. 4 is a flow chart depict an exemplary distance measurement technique between images in successive frames.

FIG. 4 depicts a flow chart of a method 400 for determining a distance between points or objects in different images at different times. The method 400 begins with a first image frame, which is shown generally at 402. Thereafter, the method 400 may determine whether the scalar value of t has been collected, which is shown generally at 404. Step 404 refers to receiving a sufficient amount of frames of data to build or initialize an estimate. One example may require about 100 frames of data to construct the initial estimate. In this example, the equation t=t+1 indicates the receipt of a new frame of data. The determination of whether a sufficient amount of frames have been collected, through the receipt of new frames t=t+1, is shown generally at 404. If at step 404 it is determined that t=t+1 is No (i.e., meaning that no, there are not yet enough frames to initialize an estimate), as shown at 406, then the process proceeds to step 408, and the process remains in the initialization stage 409. If at step 404 it is determined that t=t+1 is Yes (i.e., meaning that yes, there are a sufficient amount of frames to build an estimate), as shown at 410, then the process continues to computing the distance between the pixels representing an object or target between successive images, which is shown generally at 412, and refers to a steady state stage 413 of method 400.

At Step 408, to initialize an estimate, the method 400 utilizes the initial conditions of:

$$\hat{\mu}_0(i)=0$$

and $$\hat{\Sigma}_0(i)=0$$

With continued reference to Step 408, the estimate to compute $\hat{\mu}_t$, $\hat{\Sigma}_t$ may be initialized through an equation, such as Welford's Algorithm, that defines the Initialized Estimate by:

$$\hat{\mu}_t(i) = \hat{\mu}_{t-1}(i) + (X_t(i) - \hat{\mu}_{t-1})/n \quad \text{(Equation 1)}$$

and $$\hat{\Sigma}_t(i) = \hat{\Sigma}_{t-1}(i) + (X_t(i) - \hat{\mu}_{t-1}(i))(X_t(i) - \hat{\mu}_t(i)) \quad \text{(Equation 2)}.$$

Once the estimate has been initialized at Step 408, and the method has determined that there are a sufficient amount of frames of data to construct the initial estimate, the method proceeds along 410 to step 412 to compute the distance between the pixels representing an object or target between successive images the system.

At step 412, a distance measurement algorithm is used to compute the distance between the pixels representing an object or target between successive images. One exemplary technique defines the distance to be computed as:

$$z_t(i) = \min_{j \in \mathcal{N}_\sigma(i)} \text{Mahalanobis}\left(X_t(i), \hat{\mu}_{t-1}(j), \frac{1}{\tau-1}\sum \hat{\Sigma}_{t-1}(j)\right) \quad \text{(Equation 3)}$$

Equation 3 details the spatial data, in terms of the pixel indices, as well as the mean and covariance matrices that are have encoded spatial data, spectral data, and temporal data.

In Equation 3, $\mathcal{N}_\sigma(i)$ is the neighborhood around pixel i, defined as an $(\sigma,\sigma)$ region around pixel i, where $\sigma$ is the spatial correlation parameter. The Mahalanobis distance (Equation 3) can be computed by defining the Mahalanobis distance as:

$$d^2 = (x-\mu)\Sigma^{-1}(x-\mu)^T \quad \text{(Equation 4)}$$

Notably, the Mahalanobis distance (Equation 4) can be substituted with any appropriate distance measure into Equation 3.

Once the distance has been computed at Step 412, the method 400 applies and application specific threshold to compute the clutter suppressed image, which is shown generally at 414. The application of the application specific threshold is computed by:

$$Y_t(i) = z_t(i) > \lambda_t(i) \quad \text{(Equation 5)}$$

The threshold value at Step 414 is application-specific that may be set by a program developer, or it may be an adaptive threshold using adaptive techniques or adaptive filtering techniques that varies the threshold level based on application-specific needs or protocols. For example, if there was an area that was producing a lot or many false detections, then the program developer or an adaptive filtering technique may choose to raise the threshold to filter out or remove some of the instances of the false detection rates. A typical threshold is a number of standard deviations away from the mean of a distribution. The value of the threshold is typically a function of how many false detections the system can handle for processing. Then, the outputted clutter suppressed image may be fed to the downstream techniques of the threat warning system for higher discriminatory processing to determine whether the candidate object is a threat or object of interest.

Once the distance has been computed at step 412 and applied to the threshold at step 414, the method 400 may then update the estimate, which is shown generally at 416.

The estimate of the distance may be updated subsequent image data frames that are obtained based on defining the updated estimate as:

$$\hat{\mu}_t(i) = \hat{\mu}_{t-1}(i) + (X_t(i) - X_{t-\tau}(i))/\tau \quad \text{(Equation 6)}$$

and $$\hat{\Sigma}_t(i) = \hat{\Sigma}_{t-1}(i) + (X_t(i) - \hat{\mu}_{t-1})(X_t(i) - \hat{\mu}_{t-1}(i))^T - (X_{t-\tau}(i) - \hat{\mu}_{t-1}(i))(X_{t-\tau}(i) - \hat{\mu}_{t-1}(i))^T \quad \text{(Equation 7)}.$$

While Equations 6 and 7 represent an exemplary form of Welford's Algorithm, other exemplary techniques are possible.

Subsequent to Step 416, the method 400 may repeat the steady state stage 413 for a successive or subsequent image frame t=t+1 as shown at 418 to repeat step 412, by way of determining that enough frames exist at Step 404, with the updated estimate from step 416. This process is repeated until the computed distance from step 412 enables the determination of whether the target detection in an image frame is a distance that exceeds a threshold parameter. If the threshold parameter is exceeded, then that is indicative of a candidate object detection to be fed to further downstream discriminatory object detection processing as referenced in FIG. 3.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/-0.1% of the stated value (or range of values), +/-1% of the stated value (or range of values), +/-2% of the stated value (or range of values), +/-5% of the stated value (or range of values), +/-10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A method for clutter suppression in an object detection technique, the method comprising:
estimating a first scene in a first image using spectral data and temporal data obtained from an optical sensor on a moving platform;
estimating a second scene in a second image using spectral data and temporal data from the optical sensor on the moving platform;
detecting the presence of a candidate object based on simultaneous analysis of spatial data between the first image and the second image, spectral data, and temporal data;
producing a clutter suppressed image based on detection of the presence of the candidate object from simultaneous analysis of spatial data, spectral data, and temporal data between the first image and the second image;
performing a statistical analysis to determine whether a new observation in the second image is related to an observation from the first image;
registering, at a first pixel on a focal plane array, the observation in the first image;
registering, at a second pixel on the focal plane array, the new observation in the second image; and
associating the observation in the first image with the new observation in the second image if the new observation is within a spatial parameter between two or more pixels on the focal plane array;
wherein if the new observation is within the spatial parameter, then the new observation is not the candidate object, and if the new observation is not within the spatial parameter, then classifying the new observation as the candidate object.

2. The method of claim 1, further comprising:
determining whether the new observation can be spatially associated with a distribution of previously obtained scene information from estimating the first scene at a pixel associated with the first image and within a parameter of the pixel in the second image; and
determining that there is a match between the pixel and a second pixel within the parameter, then indicating that there is not a detection of the candidate object.

3. The method of claim 1, further comprising:
determining a spatial parameter associated with at least one pixel between the first image and the second image.

4. The method of claim 3, further comprising:
selecting a radius of how far away from the at least one pixel in the first image to be evaluated.

5. The method of claim 4, further comprising:
selecting the radius in response to a determination of a velocity or speed at which the platform is moving.

6. The method of claim 5, further comprising:
determining whether a second pixel within the radius of the at least one pixel contains the presence of the new observation in the second image; and
wherein if the second pixel contains the presence of the new observation in the second image, then concluding that the new observation is not the candidate object;
wherein the presence of the new observation is not within the radius of the at least one pixel in the second image, then concluding that the new observation is the candidate object that needs to be interrogated further.

7. A computer program product including least one non-transitory computer readable storage medium on a moving platform in operative communication with a graphical processing unit (GPU) in an infrared (IR) image sensor, the storage medium having instructions stored thereon that, when executed by the GPU, implement a process to determine the presence of a candidate object needing to be further evaluated by a discriminatory object classification technique, the process comprising:
estimating a first scene in a first image using spectral data and temporal data obtained from the IR sensor on the moving platform;
estimating a second scene in a second image using spectral data and temporal data from the IR sensor on the moving platform;
detecting the presence of the candidate object based on simultaneous analysis of spatial data between the first image and the second image, spectral data, and temporal data;
producing a clutter suppressed image having an indicator of the candidate object needed for further object classification;

performing a statistical analysis to determine whether a new observation in the second image is related to an observation from the first image;

registering, at a first pixel on a focal plane array, an observation in the first image;

registering, at a second pixel on the focal plane array, a new observation in the second image;

associating the observation in the first image with the new observation in the second image if the new observation is within a spatial parameter between two or more pixels on the focal plane array; and determining that if the new observation is within the spatial parameter then the new observation is not the candidate object, and if the new observation is not within the spatial parameter then classify the new observation as the candidate object needed for further object classification.

8. The computer program product of claim 7, wherein the process further comprises:

determining whether the new observation can be spatially associated with a distribution of previously obtained scene information from estimating the first scene at a pixel associated with the first image and within a parameter of the pixel in the second image; and determining that there is a match between the pixel and a second pixel within the parameter, then indicating that there is not a detection of the candidate object.

9. The computer program product of claim 7, wherein the process further comprises:

determining a spatial parameter associated with at least one pixel between the first image and the second image.

10. The computer program product of claim 9, wherein the process further comprises:

selecting a radius of how far away from the at least one pixel in the first image to be evaluated.

11. The computer program product of claim 10, wherein the process further comprises:

selecting the radius in response to a determination of a velocity or speed at which the platform is moving.

12. The computer program product of claim 11, wherein the process further comprises:

determining whether a second pixel within the radius of the at least one pixel contains the presence of the new observation in the second image; and wherein if the second pixel contains the presence of the new observation in the second image, then concluding that the new observation is not the candidate object;

wherein the presence of the new observation is not within the radius of the at least one pixel in the second image, then concluding that the new observation is the candidate object that needs to be interrogated further.

13. A method comprising:

installing an optical sensor on a platform;

moving the platform;

capturing a plurality of sequential images or video stream via the optical sensor on the platform while the platform is moving;

suppressing clutter in the plurality of sequential images or in frames of the video stream by simultaneous analyzation of spectral data, spatial data, and temporal data obtained from the optical sensor;

estimating a first scene in a first image using spectral data and temporal data obtained from an optical sensor on a moving platform;

estimating a second scene in a second image using spectral data and temporal data from the optical sensor on the moving platform;

detecting a presence of a candidate object based on simultaneous analysis of spatial data between the first image and the second image, spectral data, and temporal data; and producing a clutter suppressed image;

performing a statistical analysis to determine whether a new observation in the second image is related to an observation from the first image;

registering, at a first pixel on a focal plane array, of the observation in the first image;

registering, at a second pixel on the focal plane array, of the new observation in the second image;

associating the observation in the first image with the new observation in the second image if the new observation is within a spatial parameter between two or more pixels on the focal plane array;

wherein if the new observation is within the spatial parameter then the new observation is not the candidate object, and if the new observation is not within the spatial parameter then classifying the new observation as the candidate object; wherein the spatial parameter is a radius from the first pixel.

* * * * *